United States Patent
Oakes et al.

(10) Patent No.: US 9,618,961 B2
(45) Date of Patent: *Apr. 11, 2017

(54) COMBINED REVERSE ENGAGEMENT ACTIVATION AND PARKING BRAKE LEVER AND METHODS OF OPERATION AND MANUFACTURE OF THE SAME

(71) Applicant: HONDA MOTOR CO., LTD., Tokyo (JP)

(72) Inventors: Philip A. Oakes, Scotia, NY (US); Scott Daniel Batdorf, Raymond, OH (US); Rob S. Zimmerman, West Liberty, OH (US); Matthew J. Alexander, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 742 days.

This patent is subject to a terminal disclaimer.

(21) Appl. No.: 13/946,768

(22) Filed: Jul. 19, 2013

(65) Prior Publication Data

US 2015/0020638 A1    Jan. 22, 2015

(51) Int. Cl.
*G05G 11/00* (2006.01)
*B62K 23/06* (2006.01)
(Continued)

(52) U.S. Cl.
CPC .............. *G05G 11/00* (2013.01); *B60T 7/105* (2013.01); *B62K 23/06* (2013.01); *F16H 61/18* (2013.01);
(Continued)

(58) Field of Classification Search
CPC .......... B60T 7/105; B60T 7/104; B60T 7/102; B60T 11/046; B62L 3/02; B62K 23/06;
(Continued)

(56) References Cited

U.S. PATENT DOCUMENTS 2,203,057 A    6/1940   Moore
3,208,299 A    9/1965   Leonard et al.
(Continued)

FOREIGN PATENT DOCUMENTS

| JP | 59105944 A | * | 6/1984 |
| JP | 4247052 B2 | | 4/2009 |
| WO | 00/50295 A1 | | 8/2000 |

OTHER PUBLICATIONS

U.S. Office Action U.S. Appl. No. 14/078,100 dated Apr. 29, 2015.

*Primary Examiner* — Daniel Yabut
(74) *Attorney, Agent, or Firm* — Squire Patton Boggs (US) LLP

(57) ABSTRACT

An apparatus may, for example, include a first lever pivoting about a first axis. The apparatus may also include a second lever mounted with the first lever, pivoting about a second axis, and biased to a first position. The first lever can be configured to engage a braking system of a vehicle when the first lever is pivoted about the first axis and the second lever is in the first position. The second lever can be configured to be pivoted about the second axis to a second position. The first lever can be configured to disengage a reverse lockout system of the vehicle when the second lever is in the second position. The second lever can be configured to be pivoted about the second axis to a third position, which cases the first lever to engage a parking brake mechanism of the vehicle.

8 Claims, 27 Drawing Sheets

Forward

(51) Int. Cl.
*G05G 1/04* (2006.01)
*F16H 61/18* (2006.01)
*B60T 7/08* (2006.01)
*B60T 7/10* (2006.01)

(52) U.S. Cl.
CPC .......... *G05G 1/04* (2013.01); *Y10T 29/49826* (2015.01); *Y10T 74/2039* (2015.01)

(58) Field of Classification Search
CPC ........ B62K 23/02; B62K 11/14; G05G 11/00; G05G 13/00; G05G 13/02; G05G 1/04; G05G 1/06; Y10T 74/2039; Y10T 74/20274; Y10T 74/2028; Y10T 74/20287; Y10T 74/2042; F16H 61/18; F16H 61/16; F16H 2061/185
See application file for complete search history.

(56) References Cited

U.S. PATENT DOCUMENTS

| | | |
|---|---|---|
| 4,188,834 A | 2/1980 | Wakatsuki et al. |
| 4,316,531 A * | 2/1982 | Harpster ............... B62K 23/06 192/114 R |
| 4,624,350 A | 11/1986 | Akashi |
| 4,629,206 A | 12/1986 | Omagari et al. |
| 4,667,785 A * | 5/1987 | Toyoda ................... B62K 23/02 192/13 A |
| 4,840,082 A | 6/1989 | Terashima et al. |
| 4,976,166 A | 12/1990 | Davis et al. |
| 4,977,792 A | 12/1990 | Nagano |
| 5,038,881 A | 8/1991 | Wysocki et al. |
| 5,613,584 A | 3/1997 | Bremner et al. |
| 6,389,928 B1 * | 5/2002 | Kobayashi .............. B60T 7/104 188/24.22 |
| 6,521,851 B2 | 2/2003 | Handa et al. |
| 6,695,086 B2 | 2/2004 | Kawamoto |
| 6,835,904 B2 | 12/2004 | McGuire et al. |
| 8,490,998 B1 | 7/2013 | Stevens |
| 9,180,843 B2 * | 11/2015 | Heit ....................... B60T 7/104 |
| 2007/0227290 A1 | 10/2007 | Ferenc et al. |
| 2008/0121063 A1 | 5/2008 | Thrower |
| 2009/0038427 A1 | 2/2009 | Watarai |
| 2010/0083788 A1 | 4/2010 | Jordan et al. |
| 2013/0069355 A1 | 3/2013 | Gohr et al. |
| 2013/0098195 A1 | 4/2013 | Thielvoldt et al. |
| 2013/0146385 A1 | 6/2013 | Bowers |
| 2015/0020638 A1 | 1/2015 | Oakes et al. |

* cited by examiner

COMBINED REVERSE ENGAGEMENT ACTIVATION AND PARKING BRAKE LEVER AND METHODS OF OPERATION AND MANUFACTURE OF THE SAME

BACKGROUND

Field

Various embodiments may provide a convenient mechanism and system for users of vehicles that include handbrakes to operate reverse assist mechanisms in connection with the handbrake. For example, saddle-type vehicles such as an all-terrain vehicle (ATV), snowmobile, motorcycle, or the like may benefit from certain embodiments.

Description of the Related Art

Certain saddle type vehicles include a left hand brake system that is configured to mount to a left handlebar and be operated by an operator's left hand. Some of these brake systems also include interaction with a reverse engagement activation system.

Current designs for such brake systems include a push button type engagement system. To put the vehicle into reverse, a button on the left brake handle assembly must be pushed. This engages a second lever that is connected by a cable to the transmission. When the button is pushed and the brake lever pulled, the cable on the second lever is pulled, changing the gear engagements in the transmission and will now allow the operator to shift into reverse.

An example of such a system is illustrated in U.S. Pat. No. 6,835,904 (the '904 patent), which is hereby incorporated herein by reference in its entirety. As shown in FIG. 2 of the '904 patent, a reverse engage switch 13 can be used.

SUMMARY

According to certain embodiments, an apparatus may include a first lever configured to pivot about a first axis. The apparatus may also include a second lever mounted with the first lever and configured further to pivot about a second axis offset from the first axis. The second lever can be configured to be biased to a first position. The first lever can be configured to engage a braking system of a vehicle when the first lever is pivoted about the first axis and the second lever is in the first position. The second lever can be configured to be pivoted about the second axis to a second position different from the first position. The first lever can be configured to disengage a reverse lockout system of the vehicle when the second lever is in the second position. The second lever can be configured to be pivoted about the second axis to a third position different from the first position or the second position. The first lever can be configured to engage a parking brake mechanism of the vehicle when the second lever is in the third position.

In certain embodiments, the first lever can include an arm having a first engagement portion. The first engagement portion can be configured to be pulled from a front direction to a rear direction to engage the braking system.

In certain embodiments, the second lever can include a second engagement portion configured to permit selection of the first position, the second position, or the third position.

In certain embodiments, an apparatus may include first activation means for pivoting about a first axis. The apparatus may also include second activation means, mounted with the first activation means, for pivoting about a second axis offset from the first axis. The apparatus may further include biasing means for biasing the second activation means to a first position. The first activation means may further be for engaging a braking system of a vehicle when the first activation means is pivoted about the first axis and the second activation means is in the first position. The second activation means may further be for pivoting about the second axis to a second position different from the first position. Moreover, the first activation means may further be for disengaging a reverse lockout system of the vehicle when the second activation means is in the second position. Furthermore, the second activation means may further be for pivoting about the second axis to a third position different from the first position or the second position. Also, the first activation means may further be for engaging a parking brake mechanism of the vehicle when the second activation means is in the third position.

An apparatus can, in certain embodiments, include a first lever for engaging a braking system and a reverse lockout system of a vehicle. The apparatus can also include a second lever positionable between a first position to allow the first lever to engage the braking system, a second position to allow the first lever to engage the reverse lockout system, and a third position to hold the first lever in engagement with the braking system to activate a parking brake.

In certain embodiments, the first lever can comprise an arm having a first engagement portion. The first engagement portion can be configured to be pulled from a front direction to a rear direction to engage the braking system.

In certain embodiments, the second lever can comprise a second engagement portion configured to permit selection of the first position, the second position, or the third position.

In certain embodiments, the apparatus can further include a first selector for permitting the second lever to disengage the reverse lockout system when the first lever is in a default position and for preventing the second lever from disengaging the reverse lockout system when the first lever is positioned away from the default position.

In certain embodiments, the apparatus can further include a second selector for preventing the second lever from moving to the second position when the first lever is positioned away from the default position and for permitting the second lever to move to the second position when the first lever is in the default position.

A method, according to certain embodiments, may include mounting a first lever on a first fulcrum to pivot about a first axis. The method may also include mounting a second lever with the first lever on a second fulcrum and configured to pivot about a second axis offset from the first axis. The method may further include biasing the second lever to a first position. The first lever may be configured to engage a braking system of a vehicle when the first lever is pivoted about the first axis and the second lever is in the first position. The second lever may be configured to be pivoted about the second axis to a second position different from the first position. The first lever may be configured to disengage a reverse lockout system of the vehicle when the second lever is in the second position. The second lever may be configured to be pivoted about the second axis to a third position different from the first position or the second position. The first lever may be configured to engage a parking brake mechanism of the vehicle when the second lever is in the third position.

BRIEF DESCRIPTION OF THE DRAWINGS:

For proper understanding of the invention, reference should be made to the accompanying drawings, wherein.

DETAILED DESCRIPTION

Various embodiments may provide a convenient mechanism and system for users of vehicles that include handbrakes to operate reverse assist mechanisms in connection with the handbrake. For example, saddle-type vehicles such as an all-terrain vehicle (ATV), snowmobile, motorcycle, or the like may benefit from certain embodiments.

Figure 1:
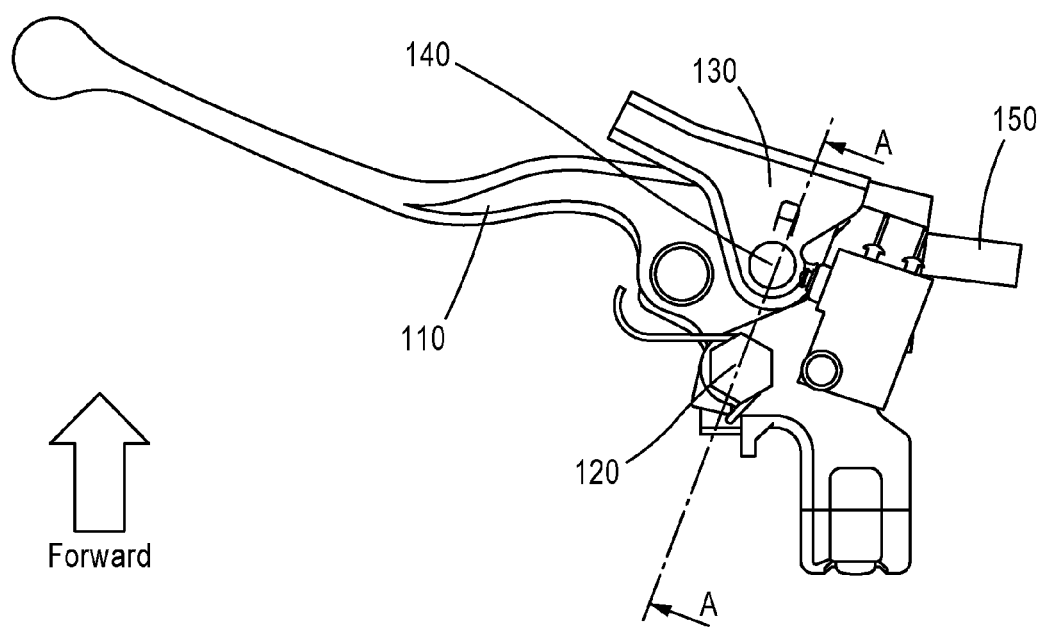
FIG. 1 illustrates a reverse system in top view in a default position, according to certain embodiments.

FIG. 1 illustrates a reverse system in top view, according to certain embodiments. As shown in FIG. 1, a first lever, such as a brake lever 110, can be configured to pivot about a first axis. The first axis can be provided by a lever pivot bolt 120.

A second lever, such as a reverse engagement lever 130, can be mounted with first lever and configured further to pivot about a second axis offset from the first axis. The second axis can be provided by a reverse pivot bolt 140. The reverse pivot bolt 140 can secure the reverse engagement lever 130 to brake lever 110. Cables 150 can provide a way for the apparatus to interact with other systems of the vehicle, such as the transmission of the vehicle and/or the braking system of the vehicle. As illustrated, cables 150 refer to a portion of the device where the cables may be routed. The actual cables themselves are omitted, for clarity of illustration.

Accordingly, the first lever can be configured to engage a braking system of the vehicle when the first lever is pivoted about the first axis and the second lever is in a first position, which can be its biased default position.

Although the apparatus can be oriented in various directions, depending how the apparatus is implemented, for the purposes of illustration an implementation in front of a left handle of a saddle-type vehicle is assumed. In such an implementation, the direction toward the front of the vehicle is illustrated by the "forward" legend in FIG. 1.

Thus, the brake lever 110 can be connected to lever pivot bolt 120 and also to a cable, of cables 150, linked to a brake system of the vehicle. The brake lever 110 can be linked to the front brakes, the rear brakes, or a both the front brakes and the rear brakes. A reverse assist lever, not visible from this view, can be connected to the same lever pivot bolt 120 and can be linked, also by a cable of cables 150, to a reverse lockout system in the vehicle's transmission.

Figure 2:
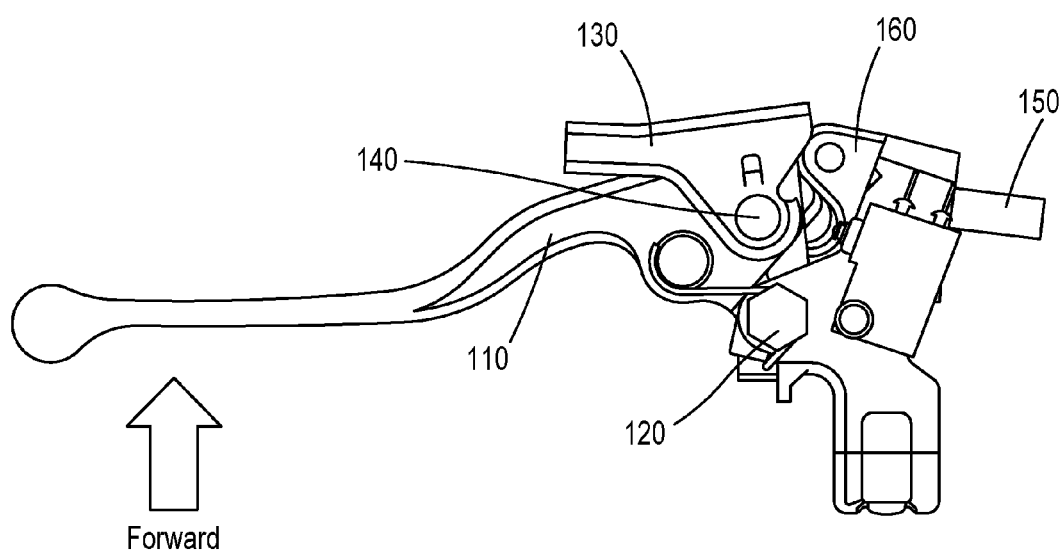
FIG. 2 illustrates a reverse system in top view in a pulled position, according to certain embodiments.

FIG. 1 illustrates the assembly in a default position. When the brake lever 110 is pulled in a backward direction, the brake lever 110 and those features mounted on the brake lever 110 may move to a position away from the default position, to a pulled position as shown in FIG. 2. Moreover, in this pulled position, tension may be increased to a braking cable of cables 150. When only the brake lever 110 is pulled, the brake lever 110 can activate the brake of the vehicle via a cable. However, in this case, the reverse assist lever 160 may remain stationary.

Accordingly, the first lever can include an arm having a first engagement portion, such as a place for the driver's fingers to be placed. The first engagement portion of the first lever can be configured to be pulled from a front direction to a rear direction to engage the braking system.

Figure 3:
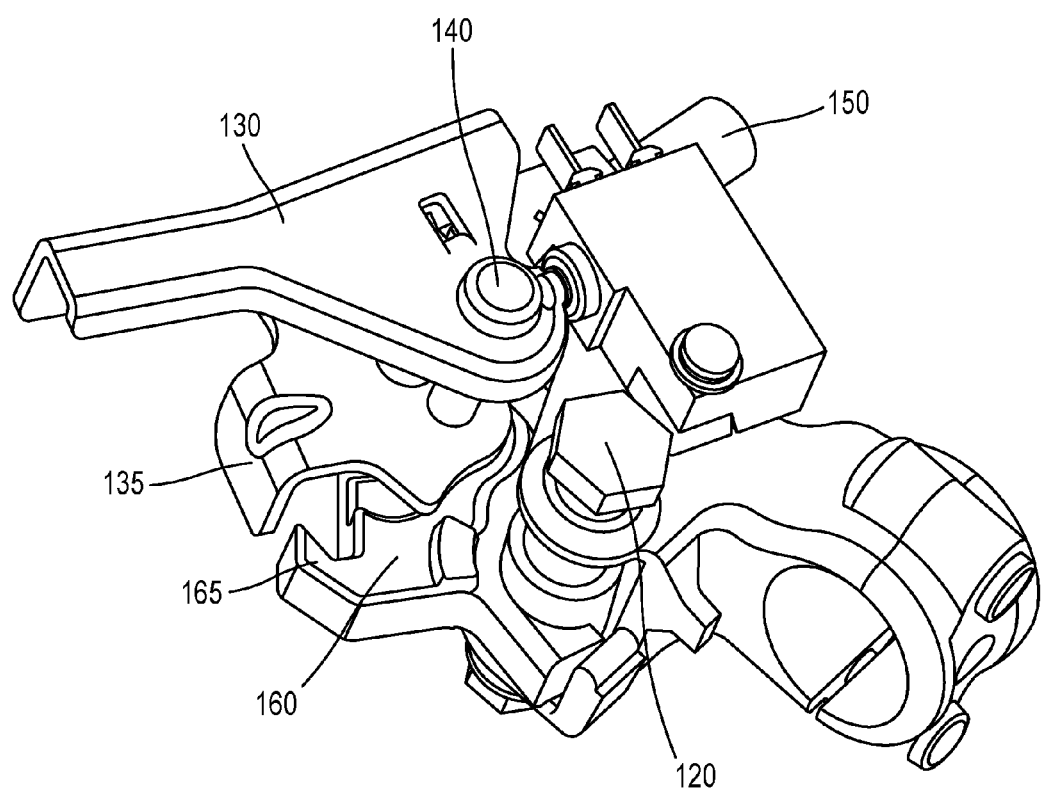
FIG. 3 illustrates a reverse system in perspective view in a default position, with a brake lever omitted, according to certain embodiments.

FIG. 3 illustrates a reverse system in perspective view in a default position, with a brake lever omitted, according to certain embodiments. As shown in FIG. 3, the reverse engagement lever 130 can be provided with a tab 135, which may be configured so as either to catch on a hook 165 of the reverse assist lever 160 or to pass over hook 165, depending the position of the reverse engagement lever 130 when the brake lever (not illustrated) is pulled from front to back.

Figure 4:
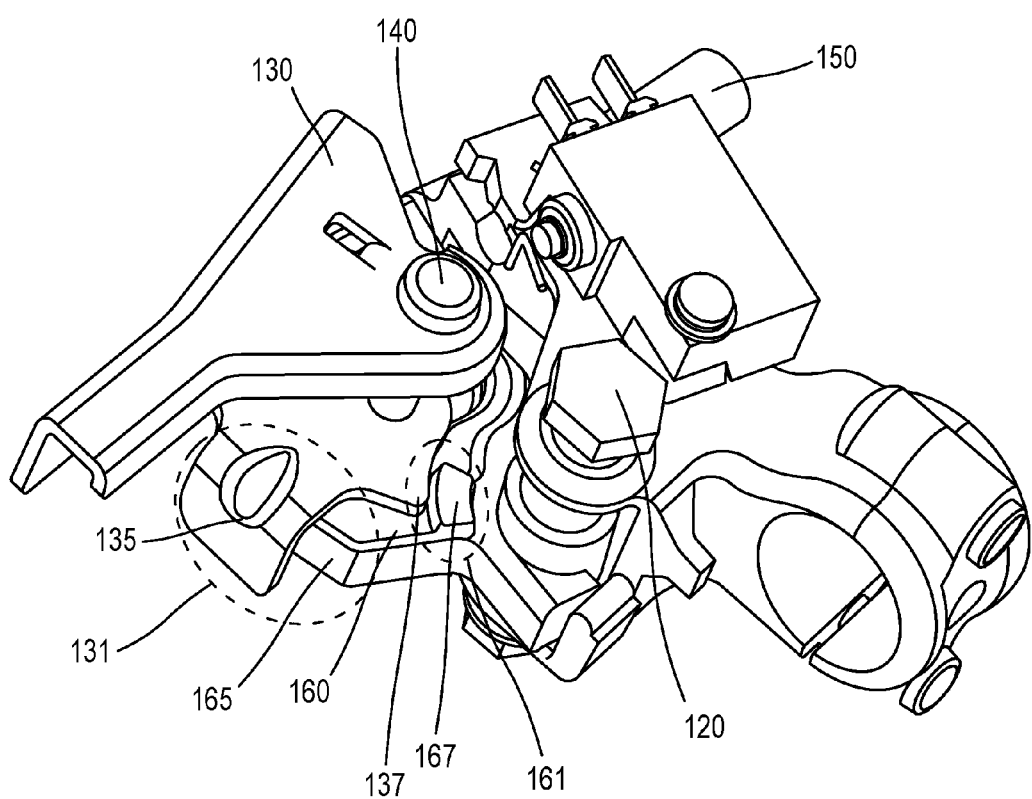
FIG. 4 illustrates a reverse system in perspective view in a pulled position, with a brake lever omitted, according to certain embodiments.

FIG. 4 illustrates a reverse system in perspective view in a pulled position, with a brake lever omitted, according to certain embodiments. As shown in FIG. 4, in a first unlocked detent area 131, because the reverse engagement lever 130 is still in a first position, the tab 135 may slide over the hook 165 without engaging it. Moreover, in a second detent area 161, a boss 167 on the reverse assist lever 160 may meet protrusion 137 on the reverse engagement lever 130, preventing the reverse engagement lever 130 from being moved into a second position. This second detent may prevent tab 135 from catching on a back portion of the reverse assist lever 160 behind hook 165.

Figure 5:
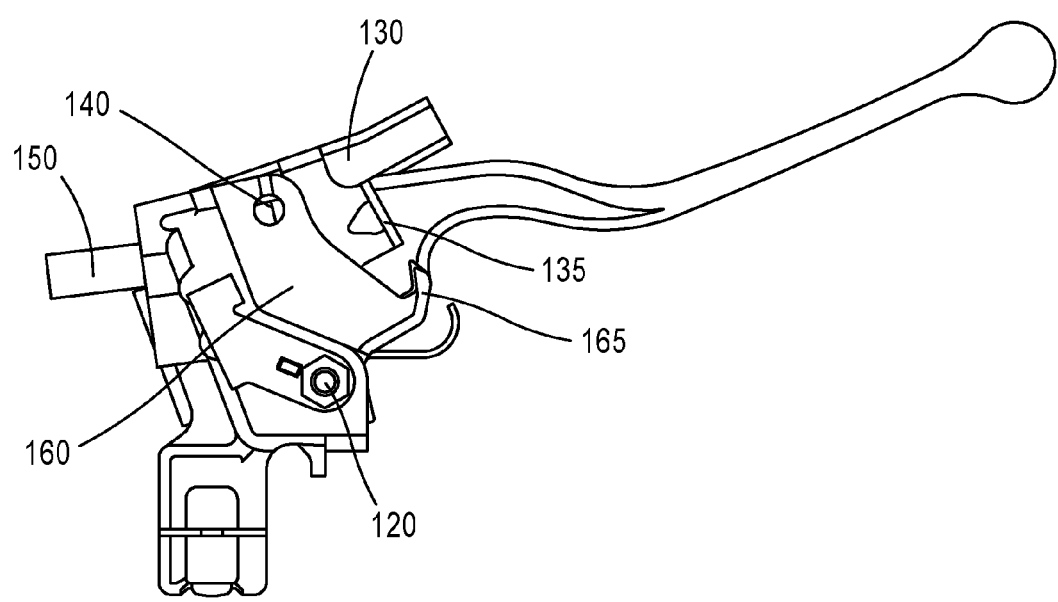
FIG. 5 illustrates a reverse system in bottom view in a default position, according to certain embodiments.

FIG. 5 illustrates a reverse system in bottom view in a default position, according to certain embodiments. As shown in FIG. 5, both the lever pivot bolt 120 and the reverse pivot bolt 140 can extend through to a bottom of the apparatus and can be variously secured on the bottom side of the apparatus.

Figure 6:
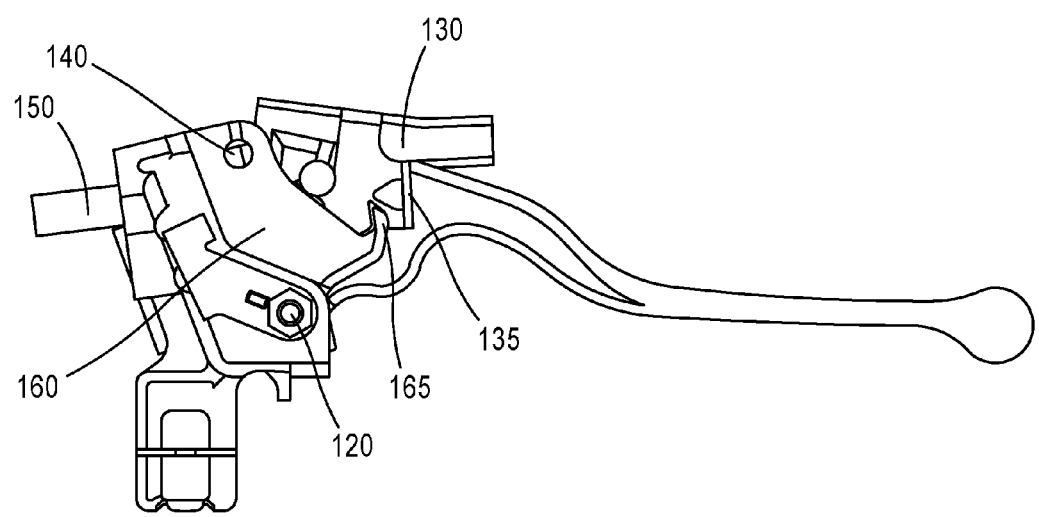
FIG. 6 illustrates a reverse system in bottom view in a pulled position, according to certain embodiments.

FIG. 6 illustrates a reverse system in bottom view in a pulled position, according to certain embodiments. As can be seen in FIG. 6, tab 135 can go over hook 165 without catching on it, when the reverse engagement lever 130 is in a first position.

Figure 7:
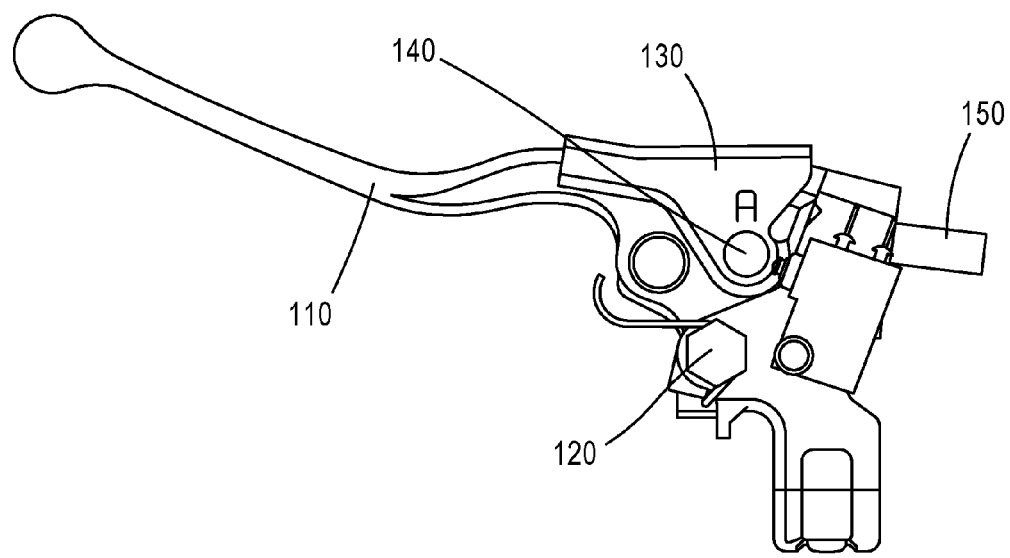
FIG. 7 illustrates a reverse system in top view with a brake lever in a default position and a reverse engagement lever in a reverse lockout disengagement position, according to certain embodiments.

The second lever, for example, reverse engagement lever 130, can be configured to be pivoted about the second axis to a second position different from the first position. FIG. 7 illustrates a reverse system in top view with a brake lever in a default position and a reverse engagement lever in the second position, for example a reverse lockout disengagement position, according to certain embodiments.

As shown in FIG. 7, the reverse engagement lever 130 can be moved from the first position illustrated in FIGS. 1-6 to a second position, in which the reverse engagement lever 130 is pushed back or in a counter-clockwise position. An inside edge of the reverse engagement lever 130 may be pushed until it comes into contact with an outside edge of the brake lever 110, as shown in FIG. 7.

The second lever can be configured to be biased to a first position. Thus a user may need to apply continuous pressure to maintain the second lever, for example reverse engagement lever 130, in the second position. Thus, the second lever can be configured to be pivoted about the second axis to a second position different from the first position.

Figure 8:
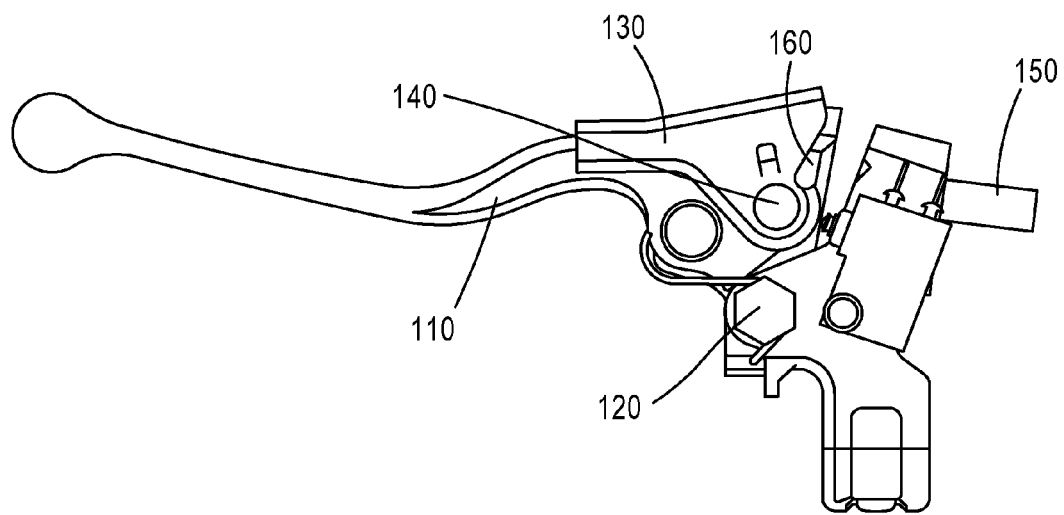
FIG. 8 illustrates a reverse system in top view with a brake lever in a pulled position and a reverse engagement lever in a reverse lockout disengagement position, according to certain embodiments.

FIG. 8 illustrates a reverse system in top view with a brake lever in a pulled position and a reverse engagement lever in a reverse lockout disengagement position, according to certain embodiments. Thus, the first lever, for example the brake lever 110, can be configured to disengage a reverse lockout system of the vehicle when the second lever, for example the reverse engagement lever 130, is in the second position.

Figure 9:
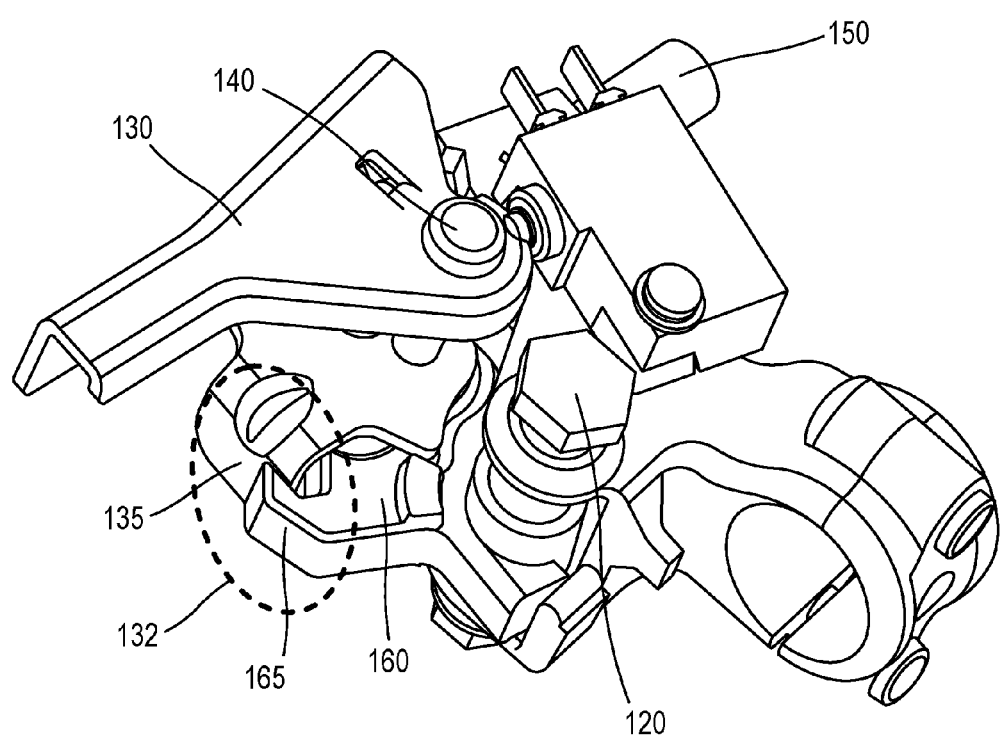
FIG. 9 illustrates a reverse system in perspective view with a brake lever in a default position, although omitted from the illustration, and a reverse engagement lever in a reverse lockout disengagement position, according to certain embodiments.

FIG. 9 illustrates a reverse system in perspective view with a brake lever in a default position, although omitted from the illustration, and a reverse engagement lever in a reverse lockout disengagement position, according to certain embodiments. As shown in FIG. 9, when the reverse engagement lever 130 is rotated into the second position, tab 135 can catch on hook 165, in locked first detent position 132.

Figure 10:
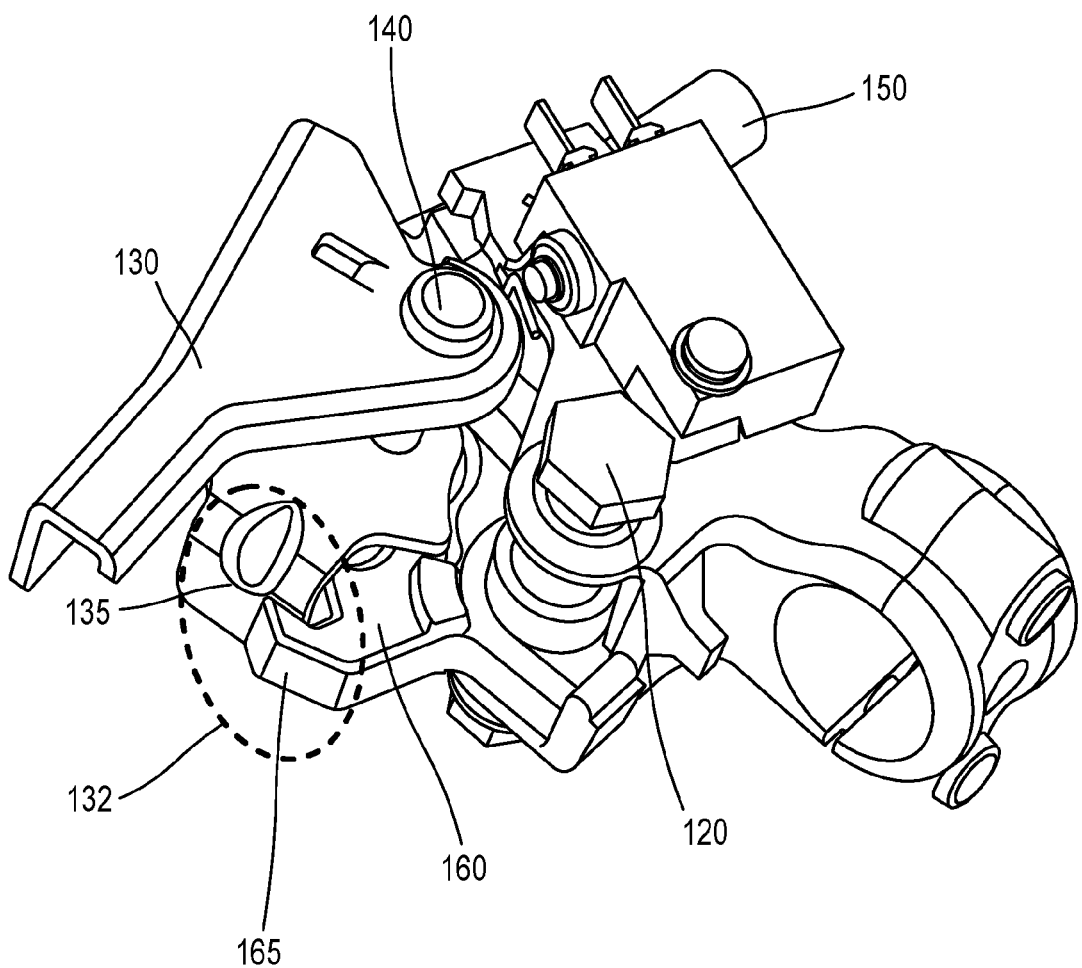
FIG. 10 illustrates a reverse system in perspective view with a brake lever in a pulled position, although omitted from the illustration, and a reverse engagement lever in a reverse lockout disengagement position, according to certain embodiments.

FIG. 10 illustrates a reverse system in perspective view with a brake lever in a pulled position, although omitted from the illustration, and a reverse engagement lever in a reverse lockout disengagement position, according to certain embodiments.

Thus, as shown in FIG. 10, a locked first detent position 132, for example, can be configured to permit the second lever, for example reverse engagement lever 130, to disengage the reverse lockout system when the first lever, for example is in a default position and configured to prevent the second lever from disengaging the reverse lockout system when the first lever is positioned away from the default position. Here the second lever can be configured with respect to when it is moved into the second position. Thus, as shown in FIG. 10, if the second lever is moved into the second position, and then the first lever is pulled away from its default position, the second lever can lock with a third lever, for example the reverse assist lever 160, and thereby pull a cable of cables 150 to disengage a reverse lockout mechanism.

Figure 11:
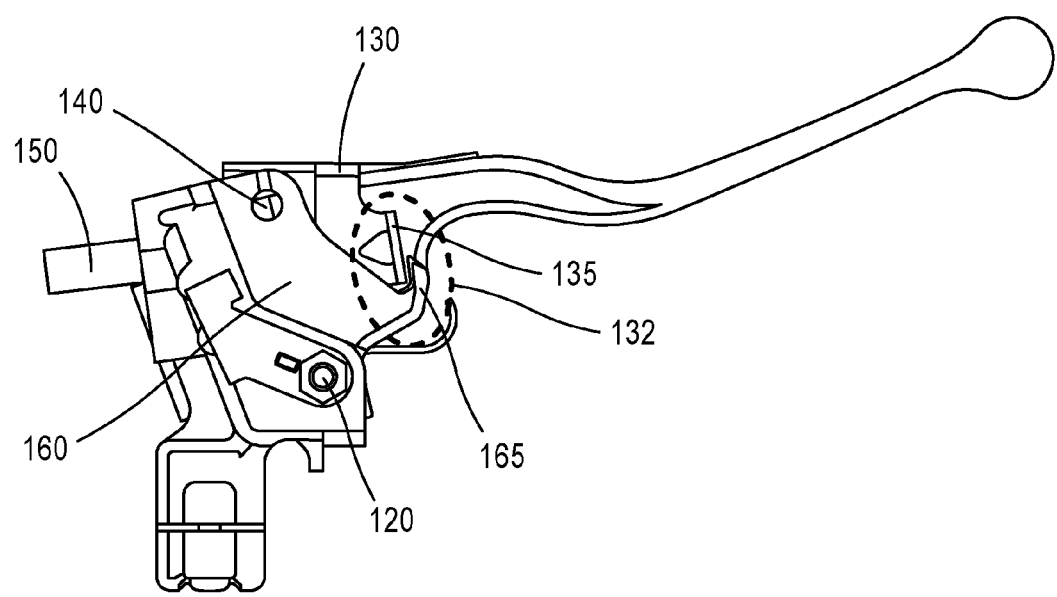
FIG. 11 illustrates a reverse system in bottom view with a brake lever in a default position and a reverse engagement lever in a reverse lockout disengagement position, according to certain embodiments.

FIG. 11 illustrates a reverse system in bottom view with a brake lever in a default position and a reverse engagement lever in a reverse lockout disengagement position, according to certain embodiments. As shown in FIG. 11, reverse engagement lever 130 can engage with reverse assist lever 160 within the locked first detent position 132, using the hook 165 and the tab 135.

Figure 12:
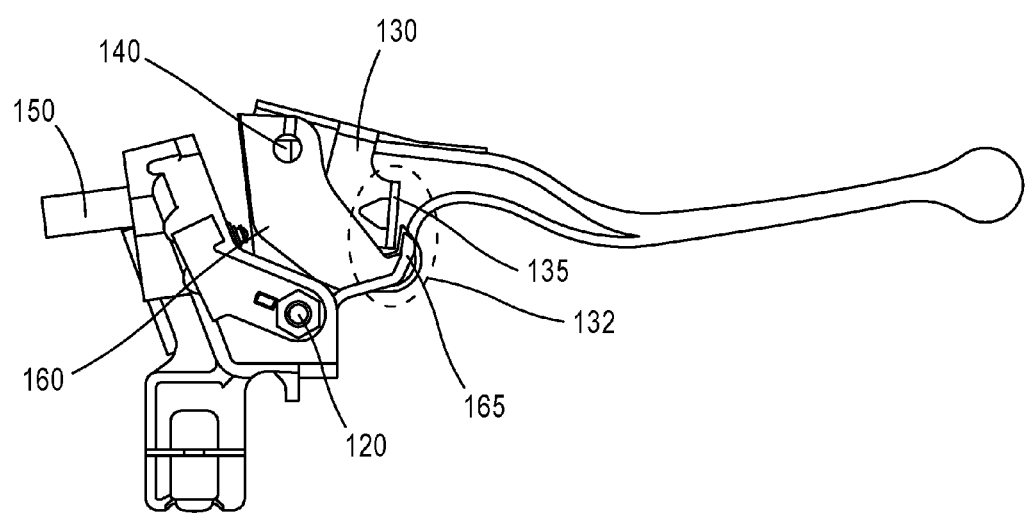
FIG. 12 illustrates a reverse system in bottom view with a brake lever in a pulled position and a reverse engagement lever in a reverse lockout disengagement position, according to certain embodiments.

FIG. 12 illustrates a reverse system in bottom view with a brake lever in a pulled position and a reverse engagement lever in a reverse lockout disengagement position, according to certain embodiments. As shown in FIG. 12, the tab 135 of the reverse engagement lever 130 can pull the hook 165 of the reverse assist lever 160, thereby supplying additional tension to a cable of cables 150. Accordingly, the brake lever 110 and the reverse assist lever 160 can move together.

Thus, in general, when the reverse engagement lever 130 is pulled toward the handle (not shown), for example from a forward position to a rear position, it can pivot about a fixed point, for example reverse pivot bolt 140 on brake lever 110. A formed tab 135 on the reverse engagement lever 130 rotates into a groove or hook 165 on the reverse assist lever 160. The overlapping parts lock all three levers together.

When the reverse engagement lever 130 is pulled and then the brake lever 110 is pulled, the reverse assist lever 160 can move as well. This action pulls the cable connected to the reverse lock out and disengages it. If the vehicle is stopped and in neutral, the operator may now be able to shift the transmission into reverse.

Figure 13:
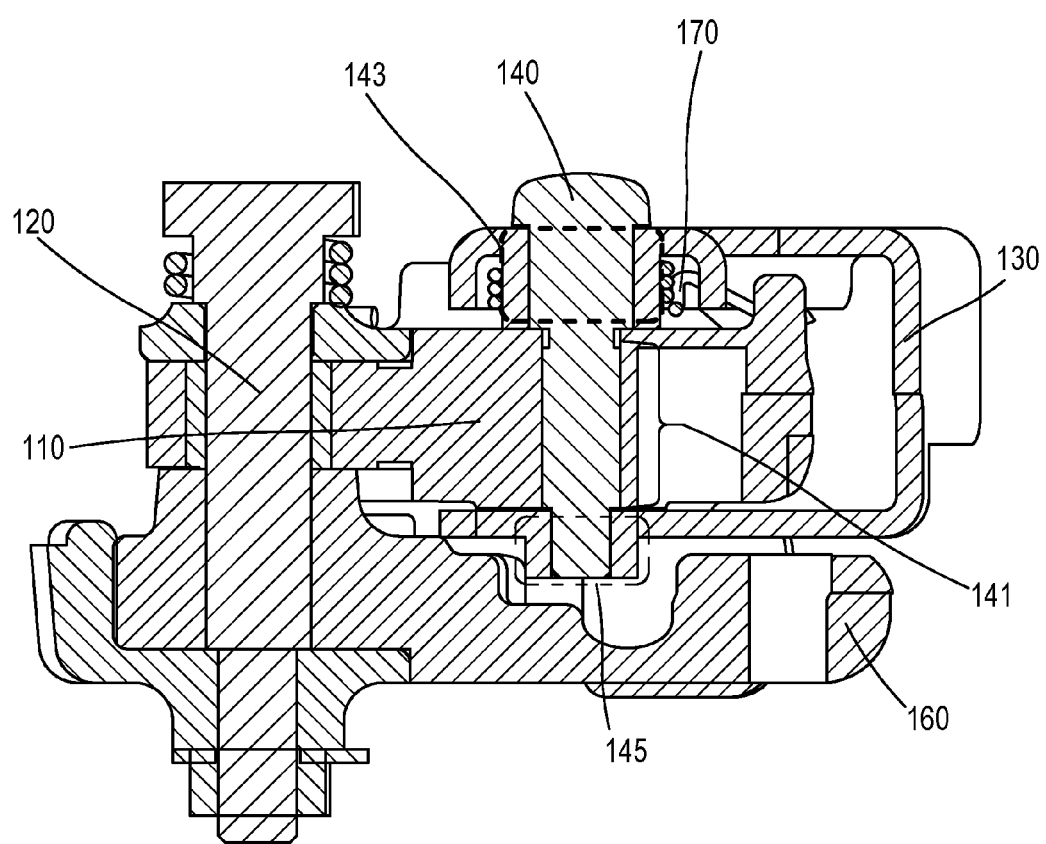
FIG. 13 illustrates a cross-section view of a reverse system according to certain embodiments.

FIG. 13 illustrates a cross-section view of a reverse system according to certain embodiments. FIG. 13 may correspond to a cross-section along line A-A in FIG. 1.

As shown in FIG. 13, lever pivot bolt 120 may extend through the assembly and may serve as one of the axes described herein. Similarly, reverse pivot bolt 140, which may be implemented as a screw, may pass through the reverse engagement lever 130 and the brake lever 110, but not the reverse assist lever 160. The reverse pivot bolt 140 may be provided with a threaded area 141 within the brake lever 110, between an upper pivot area 143 and a lower pivot area 145.

According to certain embodiments, the reverse engagement lever 130 may have integrated parking brake functionality. Thus, as a second lever, it can be configured to be pivoted about a second axis (for example, reverse pivot bolt 140) to a third position different from the first position or the second position. The first lever can be configured to engage a parking brake mechanism of the vehicle when the second lever is in the third position. A two-way spring 170 can be configured to bias the second lever (for example reverse engagement lever 130) to the first position, as distinct from both the second position and the third position.

Figure 14:
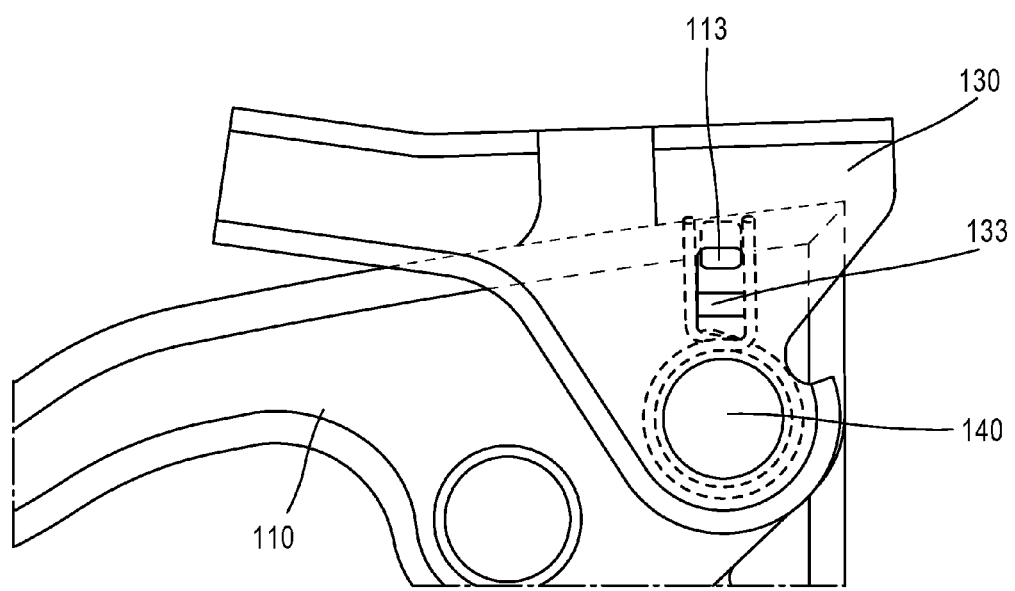
FIG. 14 illustrates top view of a first position of a reverse engagement lever, according to certain embodiments.

FIG. 14 illustrates top view of a first position of a reverse engagement lever 130, according to certain embodiments.

As shown in FIG. 14, the reverse engagement lever 130 may be configured to pivot on reverse pivot bolt 140. Moreover, the reverse engagement lever 130 may be provided with a reverse engagement lever tab 133 that is configured to provide an interference engagement with brake lever pad 113 on brake lever 110. This pad and tab arrangement may be used alone or in combination with the spring (not shown) to bias the lever in the first position.

Figure 15:
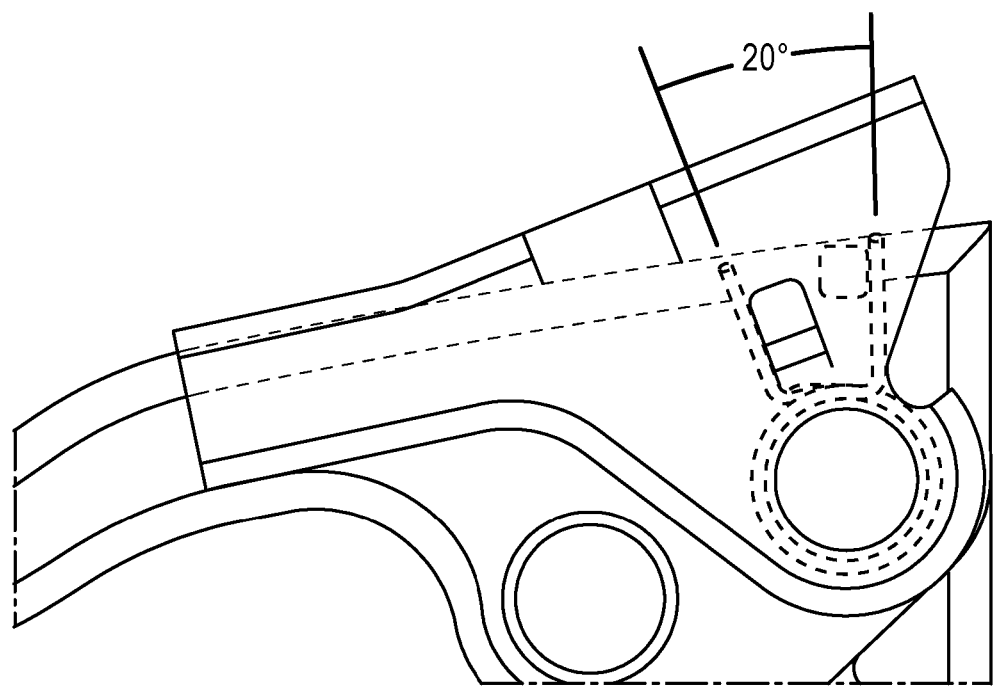
FIG. 15 illustrates top view of a second position of a reverse engagement lever, according to certain embodiments.

FIG. 15 illustrates top view of a second position of a reverse engagement lever, according to certain embodiments. As shown in FIG. 15, the second position may be about twenty degrees from the first position in a counter-clockwise direction in top view.

Figure 16:
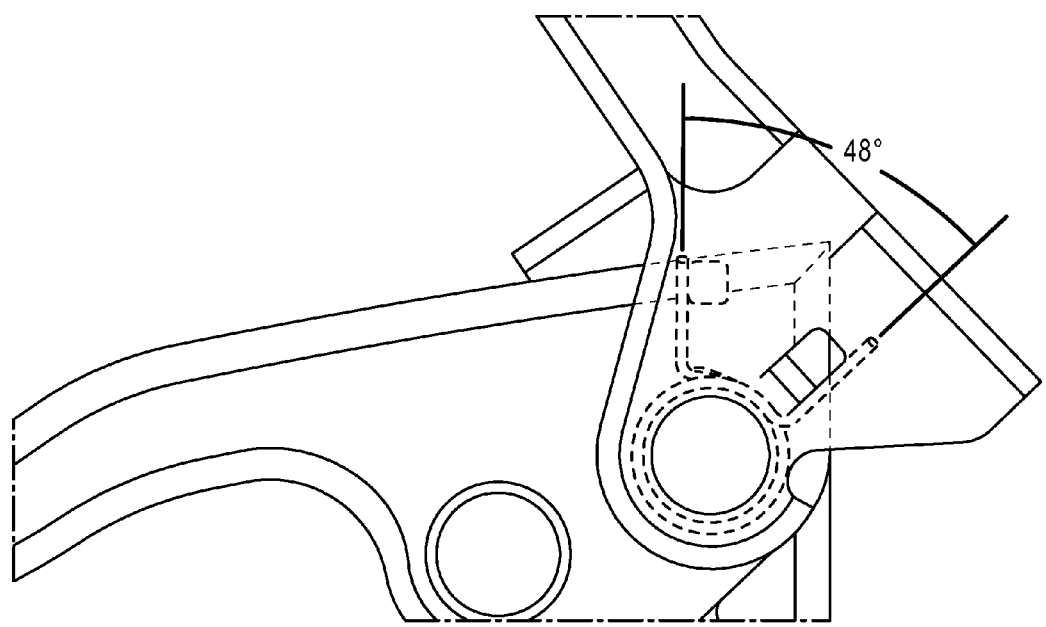
FIG. 16 illustrates top view of a third position of a reverse engagement lever, according to certain embodiments.

FIG. 16 illustrates top view of a third position of a reverse engagement lever, according to certain embodiments. As shown in FIG. 16, the third position may be about forty-eight degrees from the first position in a clockwise direction in top view.

Figure 17:
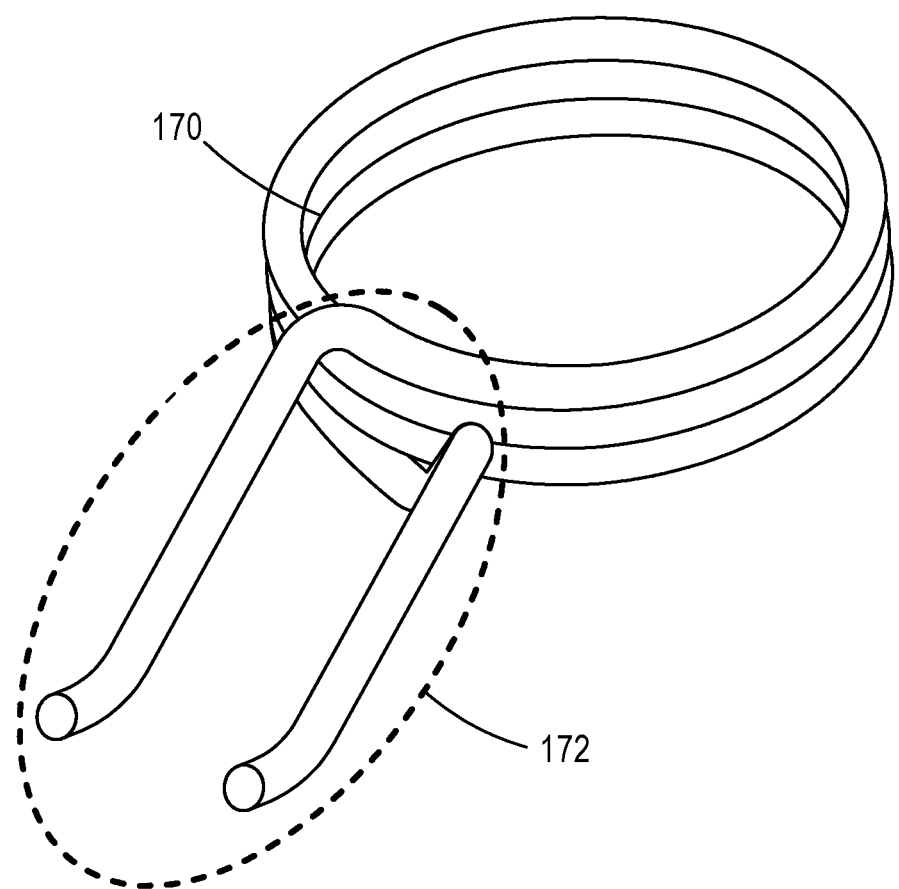
FIG. 17 illustrates a perspective view of a two-way spring according to certain embodiments.

FIG. 17 illustrates a perspective view of a two-way spring according to certain embodiments. As shown in FIG. 17, an extension 172 of two-way spring 170 may have a curved/slanted shape to engage related contact points on a reverse engagement lever and a brake lever, not shown in FIG. 17.

Figure 18:
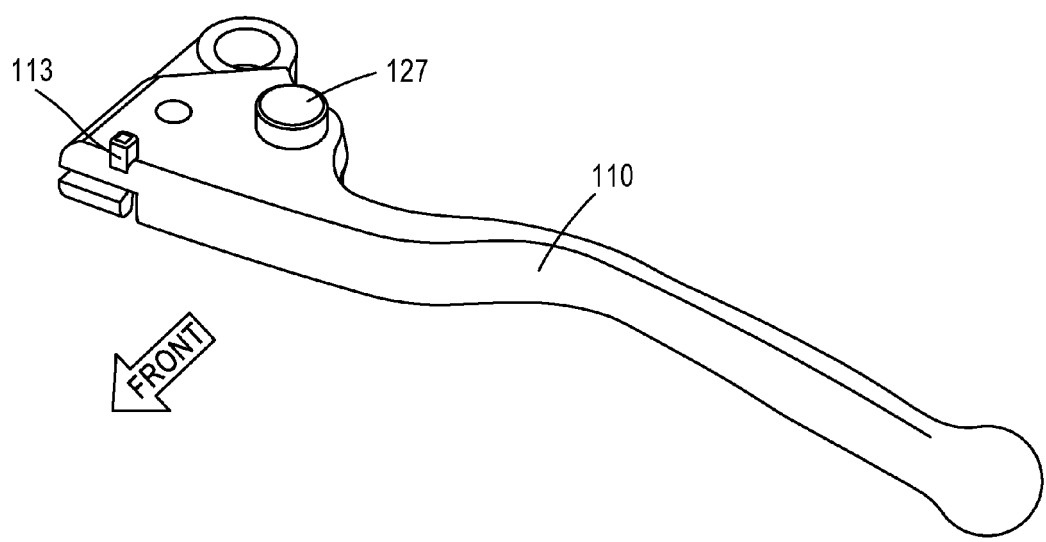
FIG. 18 illustrates a brake lever in a first perspective view according to certain embodiments.

FIG. 18 illustrates a brake lever in a first perspective view according to certain embodiments. As shown in FIG. 18, the brake lever 110 can include brake lever pad 113, which can engage an extension of the two-way spring (not shown in FIG. 18). Moreover, a spring mounting pad 127 can be included to provide a central support for the two-way spring.

Figure 19:
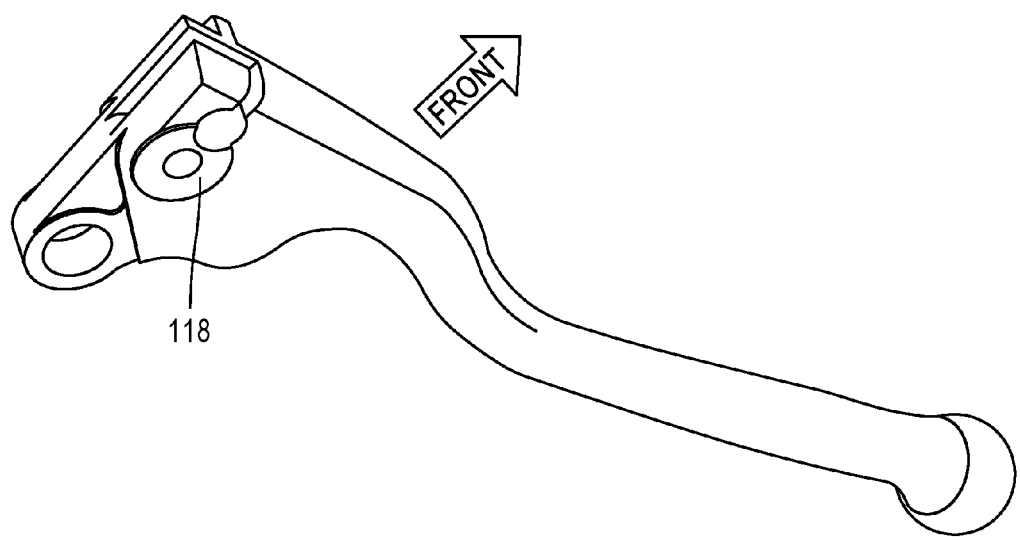
FIG. 19 illustrates a brake lever in a second perspective view according to certain embodiments.

FIG. 19 illustrates a brake lever in a second under-side perspective view according to certain embodiments. As shown in FIG. 19, small stand-off 118 can provide for reverse engagement lever (not illustrated in FIG. 19) rotation.

Figure 20:
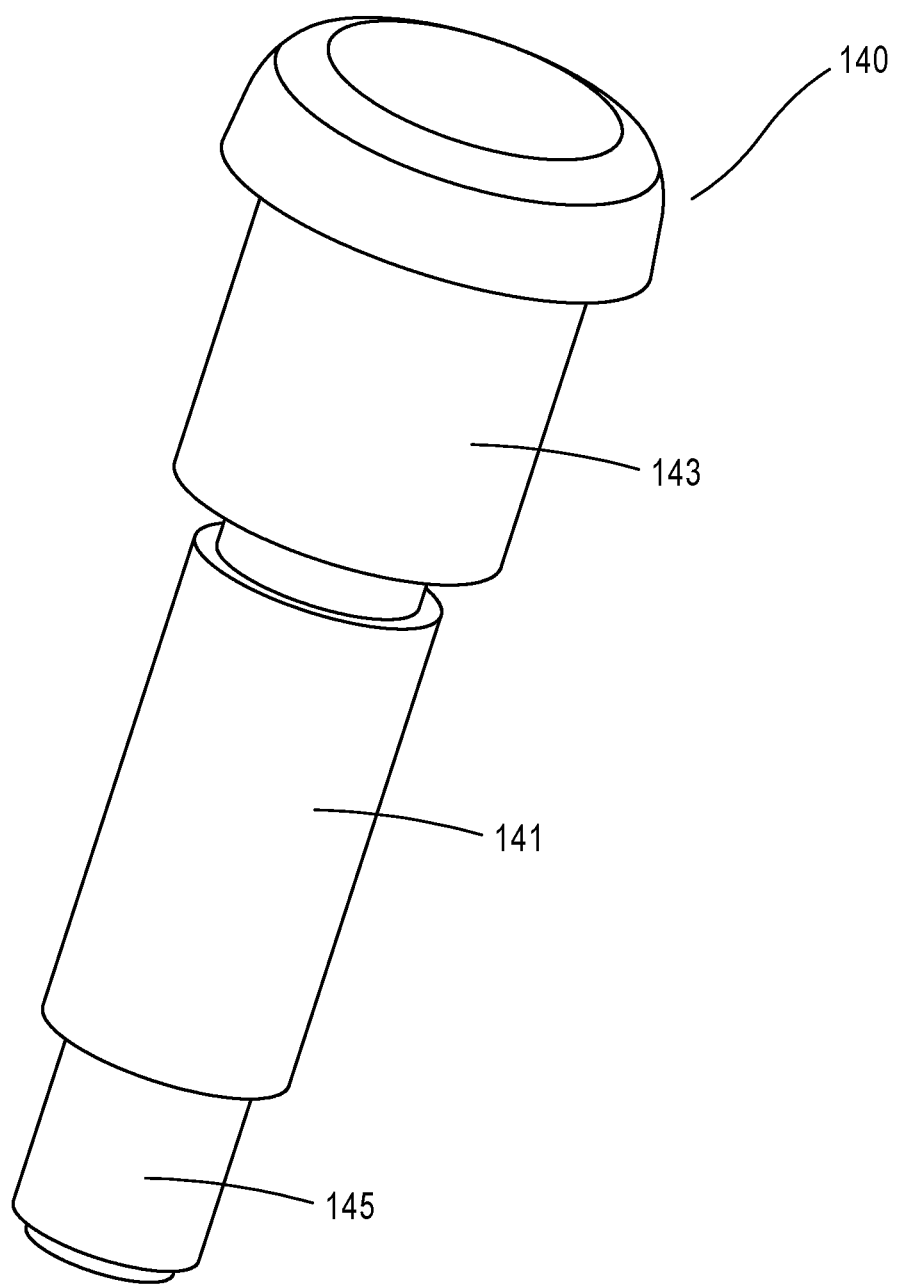
FIG. 20 illustrates a reverse pivot bolt in perspective view, according to certain embodiments.

FIG. 20 illustrates a reverse pivot bolt in perspective view, according to certain embodiments. As shown in FIG. 20, a reverse pivot bolt 140 may be provided a threaded area 141 within the brake lever (not shown in this figure), between an upper pivot area 143 and a lower pivot area 145. The lower pivot area 145 may provide an extended unthreaded section to act as a lower pivot. Similarly, the upper pivot area 143 may provide an extended unthreaded surface to act as an upper pivot.

Figure 21:
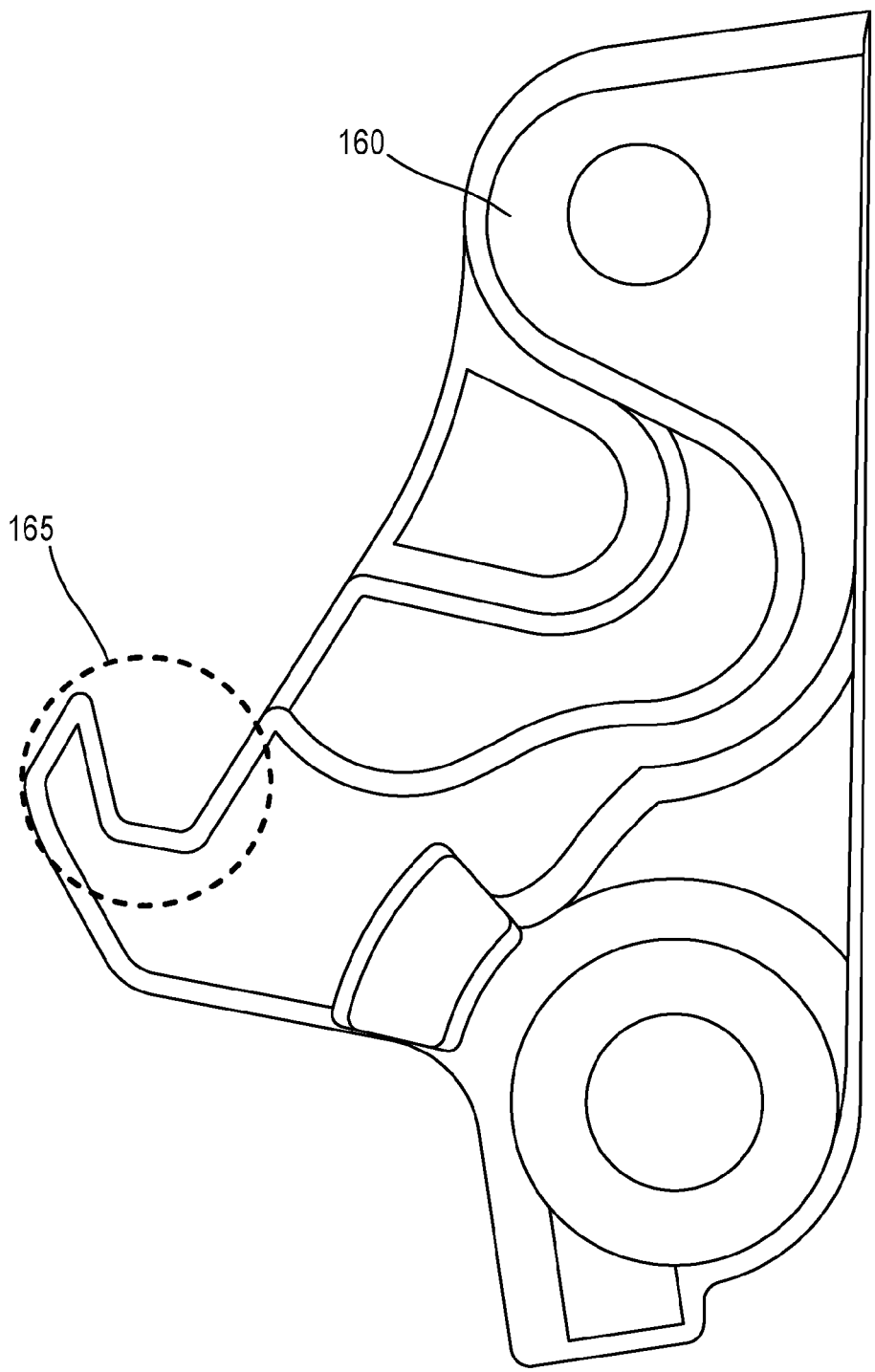
FIG. 21 illustrates a reverse assist lever in top view, according to certain embodiments.

FIG. 21 illustrates a reverse assist lever in top view, according to certain embodiments. As shown in FIG. 21, the reverse assist lever 160 can include a hook 165 that is configured to permit the reverse assist lever to latch to the reverse engagement lever (not shown in this figure).

Figure 22:
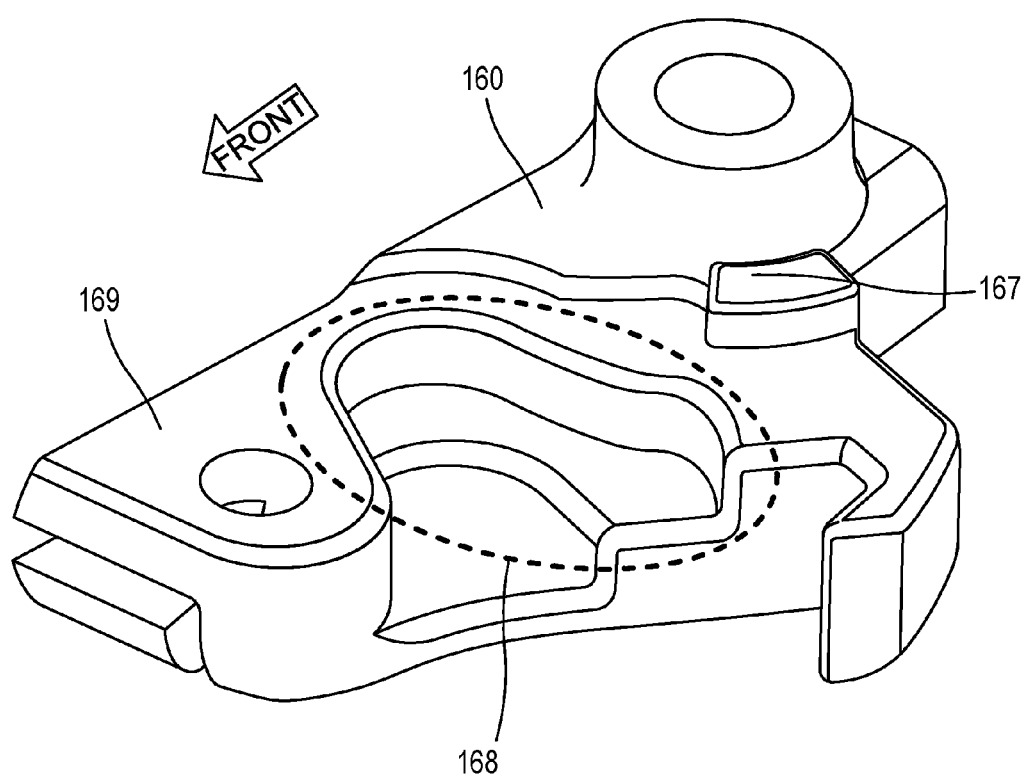
FIG. 22 illustrates a reverse assist lever in perspective view, according to certain embodiments.

FIG. 22 illustrates a reverse assist lever in perspective view, according to certain embodiments. As shown in FIG. 22, a boss 167 on the reverse assist lever 160 may meet a protrusion on the reverse engagement lever (not shown in this figure). This boss 167 may be a pad that prevents reverse lever engagement after a brake lever (not shown in this figure) is pulled. Thus, the boss 167 and/or the corresponding protrusion can serve as a second detent configured to prevent the second lever from moving to the second position when the first lever is positioned away from the default position and configured to permit the second lever to move to the second position when the first lever is in the default position.

The reverse assist lever 160 may also include a clearance area 168 that provides space for the lower pivot area of the reverse engagement lever (not shown in this figure). Furthermore, the reverse assist lever 160 may include a lower surface 169, which may provide clearance for an arm of the reverse engagement lever.

Figure 23:
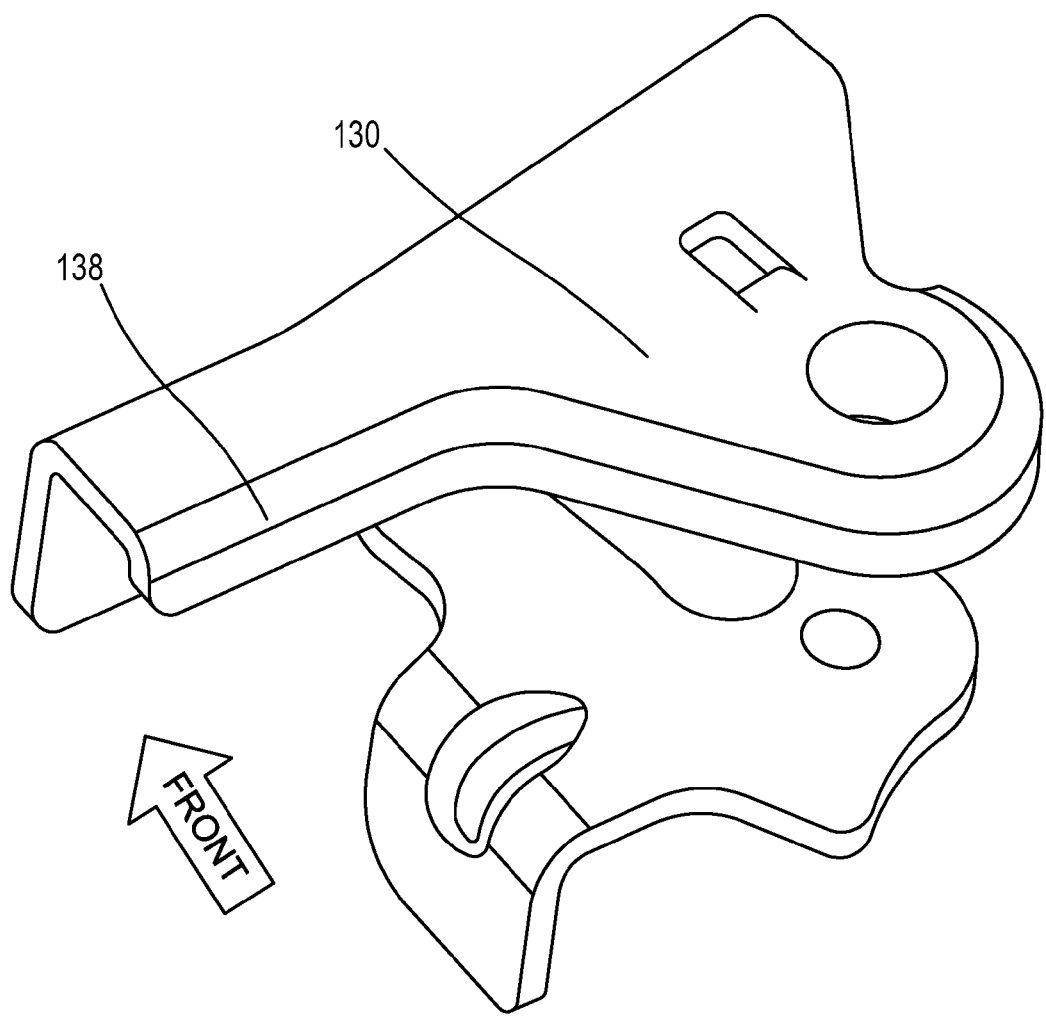
FIG. 23 illustrates a first perspective view of a reverse engagement lever, according to certain embodiments.

FIG. 23 illustrates a first perspective view of a reverse engagement lever, according to certain embodiments. As shown in FIG. 23, reverse engagement lever 130 can include a flat surface 138, which may serve as an engagement portion to allow easy parking brake activation.

Figure 24:
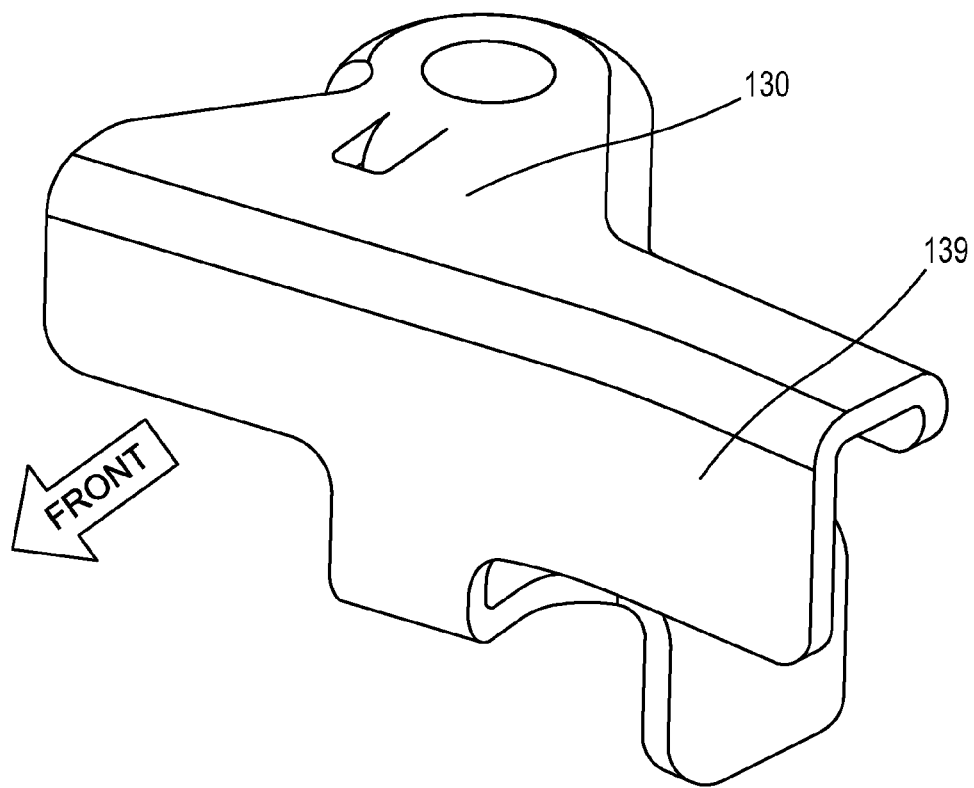
FIG. 24 illustrates a second perspective view of a reverse engagement lever, according to certain embodiments.

FIG. 24 illustrates a second perspective view of a reverse engagement lever, according to certain embodiments. As shown in FIG. 24, reverse engagement lever 130 can include a large front pad 139, which may serve as an engagement portion to trigger reverse activation. Moreover, a reverse side of this pad may contact flush against the brake lever (not shown in this figure) when the reverse engagement lever 130 is in the second position.

Figure 25:
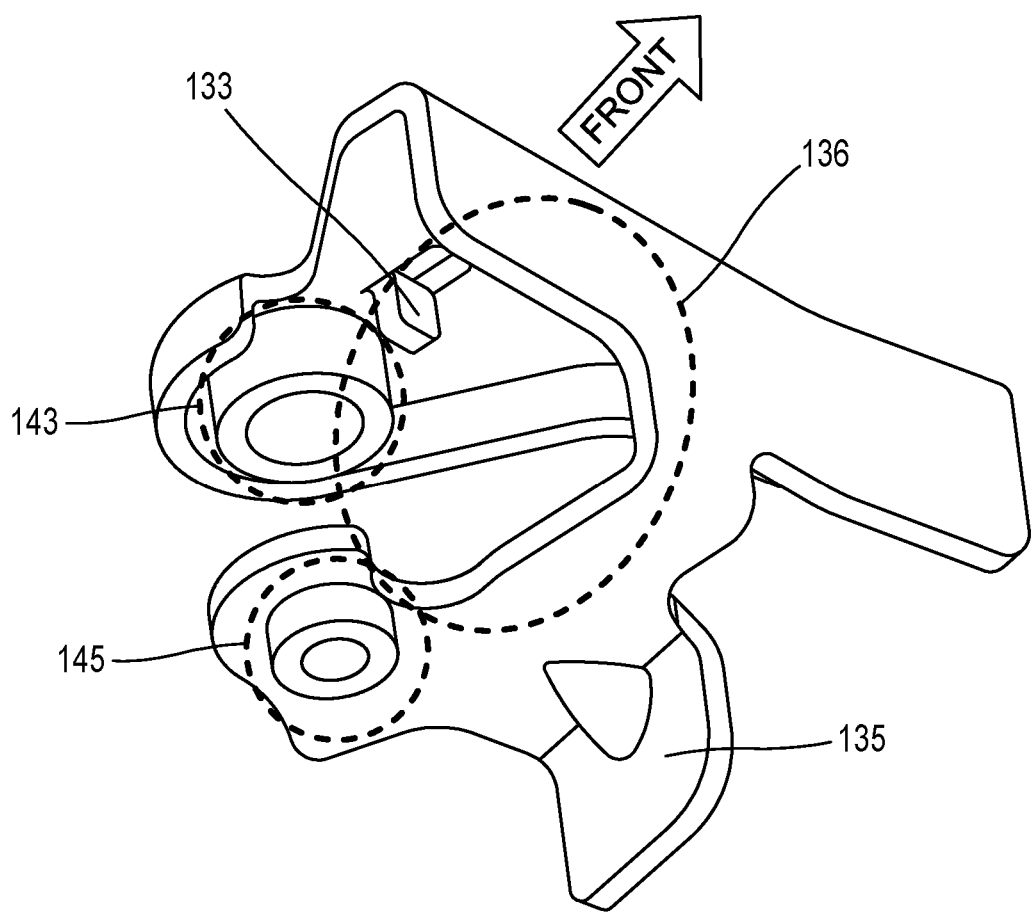
FIG. 25 illustrates a third perspective view of a reverse engagement lever, according to certain embodiments.

FIG. 25 illustrates a third perspective view of a reverse engagement lever, according to certain embodiments. This view is an underside perspective view of the reverse engagement lever 130. As shown in FIG. 25, features may be provided to correspond to upper pivot area 143 and lower pivot area 145 to support both brake lever and reverse assist lever (not shown in this figure).

A reverse engagement lever tab 133 may be provided to engage a two-way spring (not shown in this figure) and/or a pad of the brake lever (also not shown in this figure). Moreover, a tab 135 of the reverse engagement lever 130 can pull the hook of the reverse assist lever (also not shown in this figure). A cut away area 136 can permit easy cable assembly.

Thus, in certain embodiments the second lever (for example, reverse engagement lever 130) can include a second engagement portion (such as a lever or rocker arm, and which may include flat surface 138 and large front pad 139) configured to permit selection of the first position, the second position, or the third position.

Figure 26:
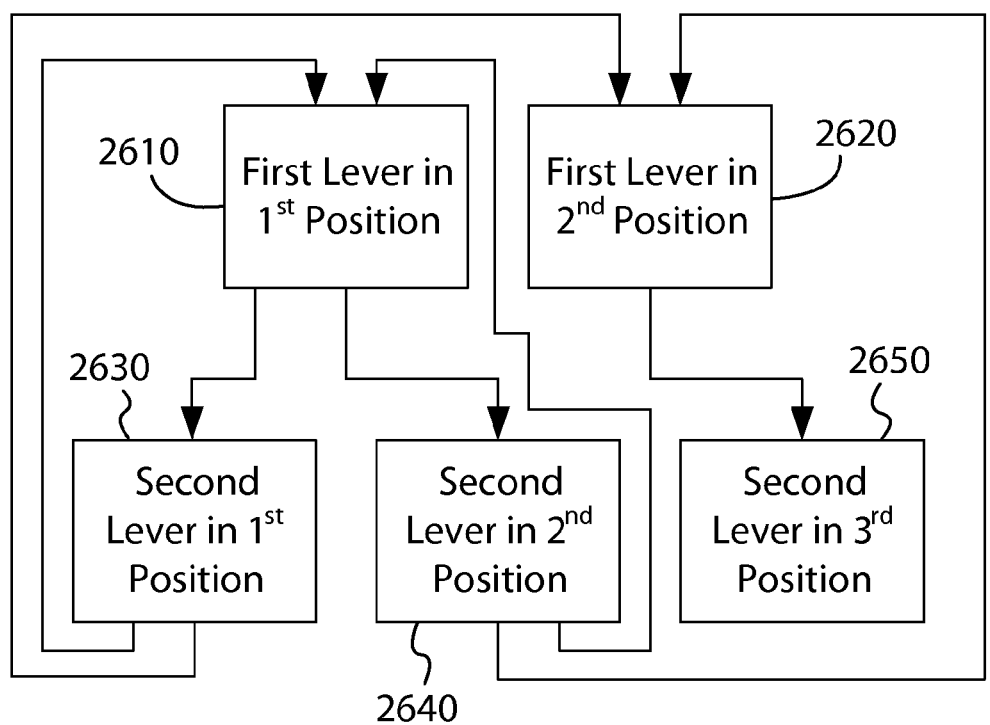
FIG. 26 illustrates a state diagram of a method of reverse engagement according to certain embodiments.

FIG. 26 illustrates a state diagram of a method of reverse engagement according to certain embodiments. As shown in FIG. 26, when a first lever is in a first position, such as when a brake lever is in a default position, the second lever may be moved either to a first position at 2630 or to a second position at 2640. When the second lever is in the first position at 2630, the first lever may be moved into a second position 2620, which may activate brakes of the vehicle. When the second lever is in the second position at 2640, the first lever may be moved into a second position 2620, which may not only activate brakes but also disengage a reverse lockout mechanism, permitting the operator to shift the vehicle into reverse. When the first lever is in the second position 2620, the second lever can be moved into or out of a third position 2650, which may be a parking brake position that locks the brakes into place without requiring constant pressure to be exerted by the operator of the vehicle.

Figure 27:
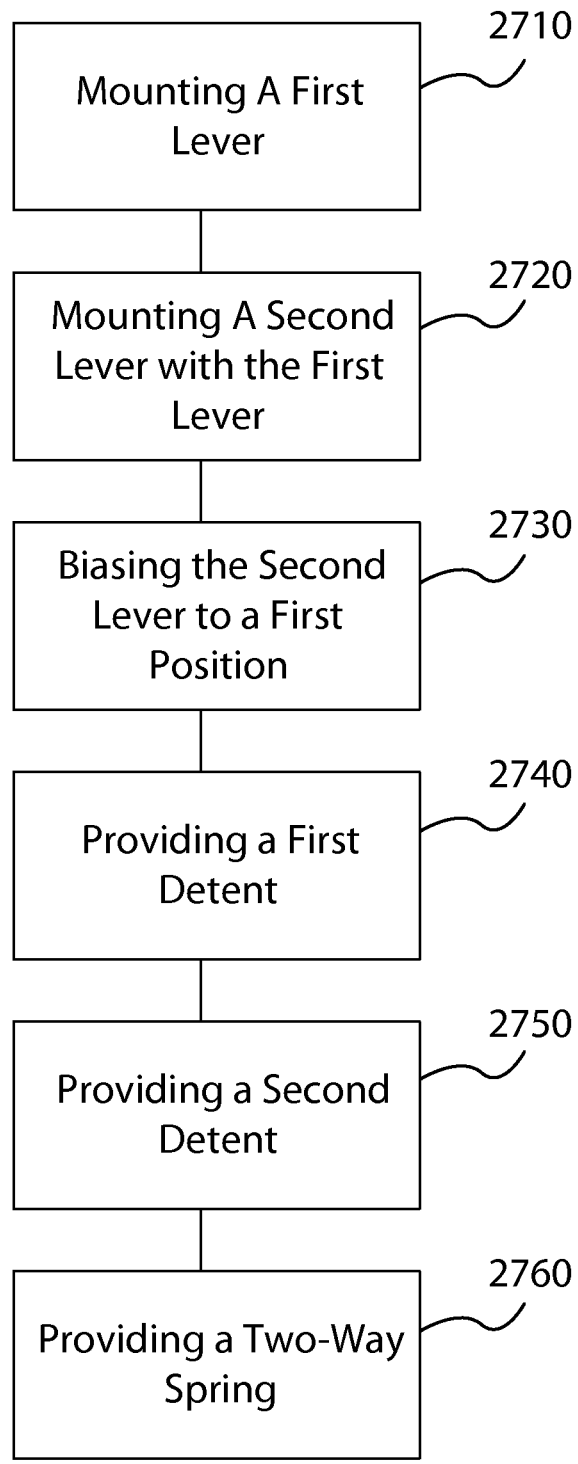
FIG. 27 illustrates a method of manufacture according to certain embodiments.

FIG. 27 illustrates a method of manufacture according to certain embodiments. The method of FIG. 27 may be used to manufacture an apparatus, such as any of the apparatus shown and described herein. For example, certain embodiments may be used to manufacture the apparatus shown in FIG. 1.

As shown in FIG. 27, at 2710, the method may include mounting a first lever on a first fulcrum to pivot about a first axis. The method may also include, at 2720, mounting a second lever with the first lever on a second fulcrum and configured to pivot about a second axis offset from the first axis. The method may further include, at 2730, biasing the second lever to a first position. The first lever can be configured to engage a braking system of a vehicle when the first lever is pivoted about the first axis and the second lever is in the first position. The second lever can be configured to be pivoted about the second axis to a second position different from the first position. The first lever can be configured to disengage a reverse lockout system of the vehicle when the second lever is in the second position. The second lever can be configured to be pivoted about the second axis to a third position different from the first position or the second position. The first lever can be configured to engage a parking brake mechanism of the vehicle when the second lever is in the third position.

The method can also include, at 2740, providing a first detent configured to permit the second lever to disengage the reverse lockout system when the first lever is in a default position and configured to prevent the second lever from disengaging the reverse lockout system when the first lever is positioned away from the default position. Moreover, the method can include, at 2750, providing a second detent configured to prevent the second lever from moving to the second position when the first lever is positioned away from the default position and configured to permit the second lever to move to the second position when the first lever is in the default position. Furthermore, the method can include, at 2760, providing a two-way spring configured to bias the second lever to the first position.

One having ordinary skill in the art will readily understand that the invention as discussed above may be practiced with steps in a different order, and/or with hardware elements in configurations which are different than those which are disclosed. Therefore, it would be apparent to those skilled in the art that certain modifications, variations, and alternative constructions would be within the spirit and scope of the invention. For example, although a left-hand-type system is shown, by mirror image a right-hand-type system may be similarly made and used. Moreover, while an implementation based on pulling cables is shown, substitutes for cables, such as wires or wireless transmitters can be used. In order to determine the metes and bounds, reference should be made to the appended claims.

We claim:

1. An apparatus, comprising:
    a first lever configured to pivot about a first axis; and
    a second lever mounted with the first lever and configured further to pivot about a second axis offset from the first axis,
    wherein the second lever is configured to be biased to a first position,
    wherein the first lever is configured to engage a braking system of a vehicle when the first lever is pivoted about the first axis and the second lever is in the first position,
    wherein the second lever is configured to be pivoted about the second axis to a second position different from the first position,
    wherein the first lever is configured to disengage a reverse lockout system of the vehicle when the second lever is in the second position,
    wherein the second lever is configured to be pivoted about the second axis to a third position different from the first position or the second position, and
    wherein the first lever is configured to hold in a brake activated position to function as a parking brake of the vehicle when the second lever is in the third position.

2. The apparatus of claim 1, wherein the first lever comprises an arm having a first engagement portion, wherein the first engagement portion is configured to be pulled from a front direction to a rear direction to engage the braking system.

3. The apparatus of claim 2, wherein the second lever comprises a second engagement portion configured to permit selection of the first position, the second position, or the third position.

4. The apparatus of claim 1, further comprising:
    a first detent configured to permit the second lever to disengage the reverse lockout system when the first lever is in a default position and configured to prevent the second lever from disengaging the reverse lockout system when the first lever is positioned away from the default position.

5. The apparatus of claim 4, further comprising:
    a second detent configured to prevent the second lever from moving to the second position when the first lever is positioned away from the default position and configured to permit the second lever to move to the second position when the first lever is in the default position.

6. The apparatus of claim 1, further comprising:
    a two-way spring configured to bias the second lever to the first position.

7. The apparatus of claim 1, further comprising:
    a third lever configured to be pivoted about the first axis.

8. The apparatus of claim 7, wherein the second lever is configured to engage the third lever in the second position and to deactivate a reverse lockout mechanism by engaging the third lever.

* * * * *